United States Patent [19]

Garcia

[11] 4,363,090
[45] Dec. 7, 1982

[54] PROCESS CONTROL METHOD AND APPARATUS

[75] Inventor: Daniel P. Garcia, Jefferson, La.

[73] Assignee: Pellerin Milnor Corporation, Kenner, La.

[21] Appl. No.: 174,594

[22] Filed: Aug. 1, 1980

[51] Int. Cl.³ .................. G05B 19/04; D06F 21/04
[52] U.S. Cl. ........................................ 364/139; 68/27;
 364/140; 364/141; 364/192
[58] Field of Search .............. 364/103, 104, 107, 400,
 364/139, 140, 141, 192; 68/27

[56] References Cited

U.S. PATENT DOCUMENTS

| | | | |
|---|---|---|---|
| 4,159,632 | 7/1979 | Grantham | 68/27 X |
| 4,195,498 | 4/1980 | Pellerin | 68/27 X |
| 4,236,393 | 12/1980 | Katzfey | 68/27 |
| 4,241,400 | 12/1980 | Kiefer | 364/104 X |

Primary Examiner—Jerry Smith
Attorney, Agent, or Firm—Browning, Bushman, Zamecki & Anderson

[57] ABSTRACT

Disclosed are method and apparatus for operating a multi-stage process. The stages of the process are carried out in a plurality of modules arranged in sequence to receive individual batches of goods to be processed. Formulas may be devised whereby particular process steps may be effected in the various modules on particular batches of goods which determine the choice of formula. In a particular embodiment disclosed, a controller operates a continuous batch washing system according to formulas devised to operate the modules of the washing system to accommodate particular wash requirements of the batches of goods. Continuous access to the controller is provided for modification of the formulas.

19 Claims, 6 Drawing Figures

PROCESS CONTROL METHOD AND APPARATUS

BACKGROUND OF THE INVENTION

1. Field of the Invention

The present invention pertains to techniques for controlling the operation of multi-stage processes. More particularly, the present invention relates to methods and apparatus for operating batch processing systems, including a plurality of process stations for sequentially receiving goods arranged in batches. The present invention finds particular application to continuous batch washing systems which maintain the isolation of batches of goods to be laundered with individual process requirements.

2. Description of Prior Art

Continuous batch, multi-stage processing systems are known, and may be operated by means of programmed controls. In particular, continuous batch washing systems may include a plurality of washing modules mutually aligned and arranged to sequentially receive a stream of goods to be laundered, the goods being grouped in individual, mutually-isolated batches. The batches are passed from module to module, being maintained in each module for specified times and subjected therein to various stages in the laundering process.

U.S. patent application Ser. No. 59,272, filed July 19, 1979, issued Dec. 2, 1980 as U.S. Pat. No. 4,236,393, assigned to the present assignee, and which is incorporated herein by reference, discloses a continuous batch washing system including such an array of washing modules, known as a "tunnel". In the tunnel system of the '393 patent, all of the goods-handling drums of the various washing modules are mechanically linked so that agitation is effected in all of the modules in unison. Also, each module includes a scoop, as part of the drum, by which the goods in the module may be transferred to the next module in sequence by appropriate rotation of the drum. Thus, with all module drums rotating to transfer their respective loads in unison, batches may be transferred from one module to the next throughout the array of modules at the same time. Selected additives, including water, steam, soap and bleach, for example, may be appropriately added to individual modules to accommodate the laundering requirements of the specific batches of goods contained in the respective modules. Each batch is thus processed according to its requirements as the batch proceeds through the array of modules. The tunnel system may be operated by a transferable program system wherein process programmed controls assigned to individual batches may be advanced with the batches from module to module, and used to directly operate the modules containing the instant batches.

A modular tunnel processing system is potentially a highly efficient means for operating on a continuous stream of batches of goods. For example, in the aforementioned tunnel system, as many batches as there are modules in the system may be processed simultaneously. As one batch completes its transition through the module array, another batch may be added to the first module at the beginning of the process. Thus, as long as additional batches of goods to be processed are available, the tunnel system may be operated continuously. However, to maximize such efficiency of operation, and to reduce the hands-on requirements of the operator, automatic operations of the system may be maximized. As the details of the various process steps must be modified to meet changing needs of the batches, or to "fine tune" the batch processing, the control system must be sufficiently flexible to accommodate on-site process operation program changes.

SUMMARY OF THE INVENTION

The present invention provides apparatus for controlling multi-stage systems, such as batch processing systems including a plurality of modules, for example, arranged for sequentially receiving and operating on batches of goods, with the batches being mutually isolated. A memory device is provided for receiving and storing information concerning various parameters characteristic of the processing system. The memory device may also receive and store formulas for operating the batch processing system. Such formulas may include instructions for operating each module for different types of goods. Operating devices are provided whereby the instructions of the various formulas may be carried out, with the operating devices serving as communication means whereby the formula instructions direct the functioning of the various modules. Sensors are provided for detecting the conditions of the processing system, and particularly conditions within the individual modules. Such sensory information is provided to the controller apparatus whereby the controller may monitor the processes effected by the various modules.

The memory device may also receive and store data whereby the various batches being processed are identified and correlated with the various formulas. Various commands may also be received and stored in the memory device for use in starting, stopping and restarting, for example, the processing system.

A data processor may be included for receiving the various forms of information, and acting thereon to instruct the processing system for carrying out various steps according to the selected formulas. An additional memory device is provided for storing basic instructions for operation of the controller system itself. The basic instructions direct that the formulas may be altered to vary the processing of different types of goods, with the formula modifications even being made in real time while batches of goods are being processed.

The present invention provides a batch processing system, including an array of sequentially positioned modules for effecting multi-stage processes on batched goods according to selected formulas wherein the control apparatus of the system is on-site programmable for providing such formulas as well as modifications in the formulas.

Input and output terminals may be provided for communication between a system operator and the control apparatus. In particular, a cathode-ray tube device (CRT) may be used to display parameter and formula information, for example. A keyboard device may be utilized for entering the parameters, formulas, commands and batch data, as well as modifying the parameters and formulas, and commanding the system to perform various functions.

In a particular embodiment, the present invention may be used to operate a batch wash system, such as the tunnel system discussed hereinbefore. Typical parameters entered in the control system might include, for example, the number of modules in a tunnel system, identification of the modules to which various supplies may be communicated and various drain combinations available for clearing the modules. Wash formulas for use in controlling such a system might include identification and amount of various supplies to be injected in particular modules for processing particular types of batches. Additionally the agitation time may be specified in the formulas for particular batches, as well as the amount and temperature of water to be utilized in the various modules.

In a method of the invention one or more different types of batches of goods may be processed by the multi-stage processing system, with each type of batched goods automatically processed according to a particular, selected formula, for example. As the batches are loaded on a feed mechanism, for example, for communication to the modules, each batch is identified, and identification data is entered in a controller. The feed system may be synchronized with the modules so that a batch of goods may be transferred to the first stage when all of the batches in the various stages are transfered to the next stage in the sequence, the batch from the last stage being transferred to a collecting mechanism.

Each time such a batch transfer occurs, the controller reads the formulas corresponding to the types of batches in each of the stages, starting with the first stage and continuing through the array of stages until all formulas have been read. The requirements, such as supplies, specified in each formula for the corresponding batch situated in the particular stage are provided as soon as the formula is read.

Within each stage, the available process steps may be distributed over a plurality of time periods. Starting with the first time period, the controller reads each formula for each batch contained in each of the stages, starting with the first stage and continuing through the array of stages until the process requirements of the first period for each stage containing a batch are noted. As each formula is thus read, the supplies called for in the first time period in that particular stage are added as required. After all requirements for the first time period for each stage are met, the formulas are read for the requirements of the second time period, starting again with the first stage and continuing until all formulas are read. As each formula requirement is determined, the supplies called for are provided for the corresponding stage. After the second time interval has been completed, the process is repeated, with the formulas for the various stages being read to determine the requirements during the third time interval. The process is repeated until all time intervals have been completed, with all required supplies provided to the various stages as dictated by the corresponding formulas.

After all process requirements for the batches as positioned have been completed, the system may be operated to transfer the respective batches to the next stages in sequence, and a new batch may be added to the first stage. The process of reading the formulas, filling the process requirements specified, and transferring the batches is repeated to process all batches.

If at any time during the processing of the batches a stage or module is empty, there will be no formula requirements read for that particular stage. Similarly, if, after a transfer of batches, all of the modules are empty, the controller will read no formula requirements for any of the modules, and will determine that the processing has been completed.

An important feature of the present invention is the relative ready accessibility to the memory device storing the formulas. The formulas may be entered by means of the input device such as the keyboard, and may be modified by the same means. Consequently, the control system is on-site, or field, programmable to add or modify formula instructions specifying details of the processes used to operate on the batches of goods. Additionally, such formula modifications may be carried out essentially without interrupting the processing of the batched goods.

The present invention provides a highly-automated, efficient and flexible control system for processing batched goods, wherein the particular process steps may be altered readily and in real time.

DESCRIPTION OF PREFERRED EMBODIMENTS

Figure 1:
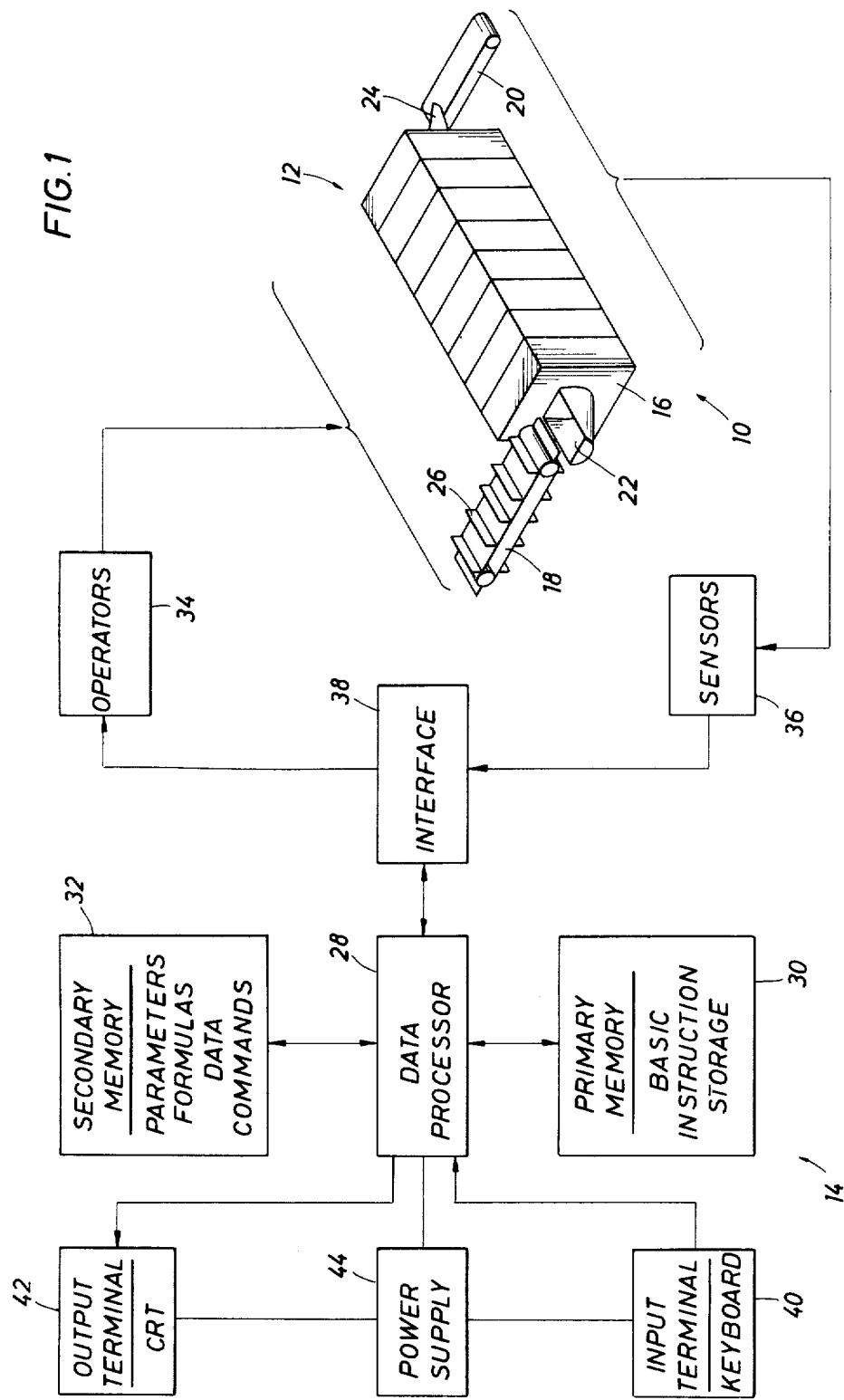
FIG. 1 is a schematic representation of a multistage batch processing system operated by a real-time programmable controller, according to the present invention.

A processing system according to the present invention is indicated generally at 10 in FIG. 1, with the processing assembly shown generally at 12 and the controller system shown generally at 14. The processing assembly 12 includes a linear array of modules 16, a feed mechanism 18, represented as a conveyor system, and a collection mechanism 20, also represented as a conveyor system. An entry chute 22 is positioned at the beginning of the module array 16 to receive goods from the feed mechanism 18. An exit chute 24 is positioned at the end of the module array 16 to deposit processed goods on the collection mechanism 20. The feed mechanism 18 is divided into compartments 26 for receiving, and maintaining mutually isolated, batches of goods.

The controller 14 includes a computer assembly comprising a data processor 28 linked with a primary memory 30 and with a secondary memory 32. The computer assembly conveys operational instructions to the processing assembly 12 by means of a system of operators 34, and receives information from the processing assembly by means of a system of sensors 36. The operators 34 and sensors 36 are coupled to the computer assembly by an appropriate interface 38.

An input terminal 40, such as a keyboard device, is provided for communication between the system operator and the data processor 28. An output terminal 42, such as a CRT device, is provided for displaying information from the data processor 28 concerning conditions in the processing assembly 12 and the identifications and locations of batches of goods, for example. A power supply 44 provides the necessary electrical power to operate the computer assembly and the associated terminals 40 and 42.

It will be appreciated that a variety of computer system components are available for use in constructing the controller 14. For example, a Motorola M6800 digital microprocessor may be utilized for the data processor 28. The primary memory 30 may include one or more erasable, programmable read-only memories (EPROMs). The secondary memory may include, for example, a magnetic core memory.

The operators 34 and the sensors 36 are selected appropriate to the requirements of the particular processing assembly 12. Typically, the operators 34 may include relays operable by electrical signals generated in response to operational instructions from the data processor 28, and configured to selectively operate valves or other control devices incorporated in the processing assembly 12, for example. The sensors 36 may include temperature sensing devices, such as bimetallic strip indicators, and electrical switches, such as limit switches activated when the system 12 achieves preselected configurations, for example.

The computer system memory capability is divided between the primary memory 30 and the secondary memory 32 based on the type of information to be entered and stored in the respective memory locations. The primary memory 30 receives and stores permanent program information used to operate the controller 14, and determines the nature and extent of programming information that may be utilized with the controller, and entered and stored in the secondary memory 32. The secondary memory 32 may receive and store parameter information characteristic of the particular processing assembly 12 which the controller 14 is to operate. The identifications of different types of goods in various batches to be processed may be stored in the secondary memory 32 as data. The various formulas devised to dictate the process steps to be effected in each of the modules of the array 16 for given types of goods in the batches, as well as various commands to the processing assembly 12, may also be entered and stored in the secondary memory 32.

It will be appreciated that the information stored in the primary memory 30 is generally of a permanent nature. Therefore, the primary memory 30 may be a read-only type, such as provided by EPROMs. The information stored in the secondary memory 32 may be readily altered, added to or deleted. Therefore, the secondary memory 32 is of a type freely accessible to the operator through the input terminal 40 for the purpose of carrying out such modifications. The separation of the memory functions between the primary memory 30 and the secondary memory 32 provides flexibility to the controller 14, and allows on-site programming of the system parameters and operation formulas, for example.

Figure 2:
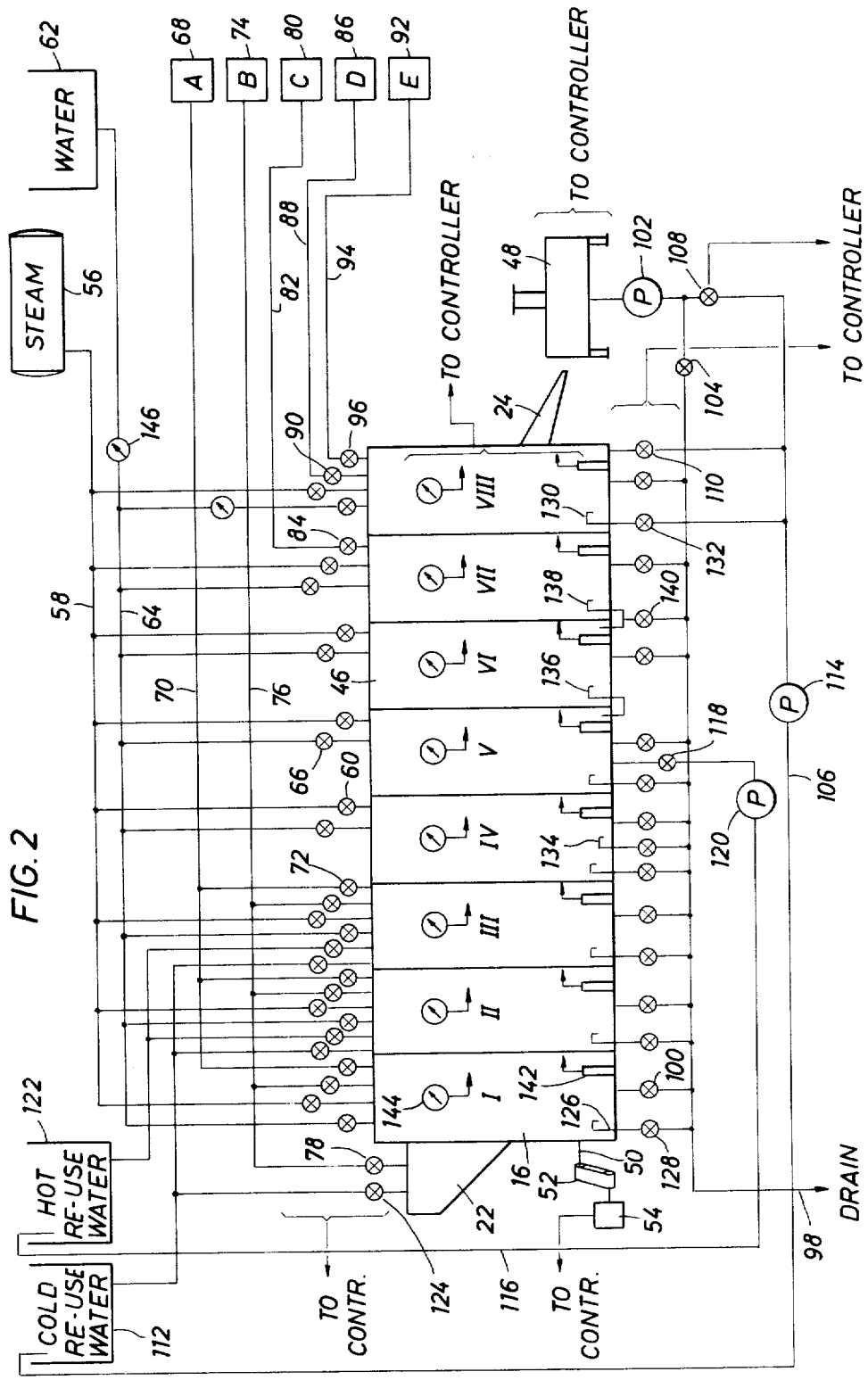
FIG. 2 is a schematic representation of the modular array of the processing system of FIG. 1, in the form of a batch washing system, indicating various operator and sensor capabilities.

In FIG. 2 a wash processing assembly is shown including eight processing modules 46, identified as I through VIII, respectively, in the module array 16. The eight modules 46 are arranged in sequence and mutually aligned. The first module I is fitted with the entry chute 22. The last module VIII is fitted with the exit chute 24. A press 48 is shown positioned to receive the processed goods exiting from the last wash module VIII.

The modules 46 may be of the type described in the aforementioned U.S. Pat. No. 4,236,393. The drums (not shown) within the modules 46 are driven by an array of coupled motors in that patent. In FIG. 2 such a linkage is indicated schematically by the common axle 50 driven, by means of a belt system 52, by a motor 54 representative, for example, of the plurality of motors which may be utilized as described in the aforementioned patent. Thus, the drums of the modules 46 may all be agitated in unison, being driven through their oscillations by the motor system 54. Likewise, the drums may be further turned in unison by the motor 54 to simultaneously transfer batches of goods from the individual modules to the immediately succeeding modules.

Various supplies, including steam and water, are available for injecting into the various modules 46 as well as the entry chute 22. In the case of each supply, a source of supply material is provided and connected to one or more of the modules 46 by means of appropriate conduits. Appropriate valves are operable to control the injection of various supplies to the chute 22 and the modules 46.

In particular, a steam source 56 may be connected by a conduit system 58 leading to each of the modules 46, with valves 60 located at each of the modules to control injection of steam into the corresponding modules. A water source 62, which may, for example, be capable of supplying water at any desired temperature, is connected to each of the modules 46 by a conduit system 64, with water valves 66 controlling the injection of water into the corresponding modules.

Steam may also be used to heat water in a given module. A chemical supply reservoir 68 may be connected to selected modules 46 by a conduit system 70, with control valves 72 regulating the flow of the particular chemical A from the source 68 into the selected modules. It will be appreciated that to effect the desired processing of different types of goods presented in batches to the modules 46 it may not be necessary to inject certain of the chemicals into all of the modules. Thus, for example, to wash materials in the modules 46, soap may be provided from the supply source 68 to the first three modules I–III as specified. Simularly, a second supply source 74 is connected to certain of the modules 46 by a conduit system 76, with valves 78 regulating the injection of the chemical B from the source 74. For example, alkali may be provided from the source 74 to the first three modules I–III. Additionally, alkali may be applied to various types of goods as they are deposited in the entry chute 22 to initiate the cleaning process.

Additional supplies may be provided for injection into specific modules 46. For example, a source 80 of supply C, which might be bleach, is connected to the penultimate module VII by a conduit 82, with flow controlled by a valve 84. A source 86 of supply D, which might be starch, for example, is connected to the last module VIII by a conduit 88, with flow controlled by a valve 90. Finally, a source 92 of supply E, which might be a neutralizer, is connected to the last module VIII by a conduit 94, with flow controlled by a valve 96.

A drain system is provided whereby fluids collected in each of the modules may be dispersed. A common drain 98 is connected to each of the modules 46 by individual drain valves 100 for selectively emptying fluids from the respective modules. Water collected in the press 48 by application of pressure to the processed goods may be drained through a pump 102, and selectively directed to the common drain 98 through a drain valve 104.

Water collected at the press 48 and in the later modules 46 is generally cleaner than water drained from the earlier modules. Such cleaner drained water may be reused in the earlier modules. Consequently, a collection conduit 106 is connected to the press drain pump 102 and to the last module VIII by means of control valves 108 and 110, respectively, whereby drain water may be selectively removed from these elements and collected in a reservoir of cold reuse water 112. An additional pump 114 propels the water to the reservoir 112. Similarly, a secondary drain 116 receives hot drain water from an earlier module V through a valve 118, with the water being propelled by a pump 120 to a hot reuse water reservoir 122. The quality of the water collected in the hot reuse water reservoir 122 is such that this water may be reused in the washing stages of modules II and III, for example. Similarly, the cold reuse water collected in the reservoir 112 may be used, for example, in the same early modules II and III. Further, the cold reuse water from the reservoir 112 may be injected in the entry chute 22 when a batch of goods is being loaded into the first module I to facilitate movement of the batch as well as to provide initial wetting thereof. A valve 124 controls the injection of the water into the chute 22. Additional valves control the flow of reuse water from the reservoirs 112 and 122 to the modules II and III.

The individual modules 46 may be fitted with overflow drains 126, connected to the common drain 98 by valves 128 for selective draining. For the later modules, such as the last module VIII, an overflow drain 130 may be connected through a valve 132 to the secondary drain 106 for collection of the overflow from the module in the cold reuse water reservoir 112. Additionally, where several different water levels are to be employed at various times in a given module, additional overflow drains 134 may be provided for limiting the depth of the water in the module at different levels as indicated in module IV. Where fluid in a given module is in such a state after processing in that module that the fluid may be reused in a prior module, an overflow drain 136 as in module VI may direct the overflow fluid from that module to the immediately preceeding module V. A variation of such a return overflow drain is shown in module VII wherein the overflow drain 138 may direct the fluid overflow from the module VII to the immediately preceeding module VI; as an option, a valve 140 connects the overflow drain 138 to the common drain 98, for example, leaving the system the flexibility of two alternate drain capabilities.

Appropriate operators 34 (FIG. 1) may be provided for selectively operating the various valves and motors described in relation to FIG. 2 in accordance with specific formulas entered in the secondary memory 32 and called upon to govern the processing of specified batches of goods. For example, electric switch operators may be used to operate the motor system 54 to selectively oscillate and rotate the drums within the modules 46. The injection of the various chemical supplies as well as the steam, and water from the several water sources may likewise be controlled by relay operators 34, for example, used to selectively open and close specified valves to inject the corresponding supplies into particular modules. For example, a particular formula may require that one or another valve be opened a specified period of time to allow injection of a given supply into a particular module throughout the time interval. The valve controlling such supply flow into the module may be pre-set to determine the flow rate through the valve when opened. Thus, by opening the valve for a specified time interval, a desired volume of the supply in question will be injected into the module in accordance with the requirements of the formula. Consequently, some or all of the injection valves may be flow-control type valves so that the controller 14 need only specify the time periods for which the individual valves are to be opened in accordance with various formulas.

Likewise, the various drain valves may be operated for specified time intervals in accordance with the formulas in the secondary memory 32. Thus, as batches of goods are being transferred among the modules 46, the fluids used to process the batches of goods may be automatically drained so that a batch entering a given module need not be exposed to fluid already used in that module to process a previous batch.

The times when the various valves and switches are opened may be controlled to the same extent as the time intervals for which the specific valves and switches are left open according to the formulas. Thus, for example, water may be added to a particular module after soap has been injected into the module. After a given period of agitation of the goods in the module, additional supplies may be added for application during the remainder of the agitation interval.

The press 48 may also be operated by the control system 14 by means of appropriate operators 34.

In addition to the various valves and switches the operators 34 may control, the various pumps may be operated under the direction of the controller 14 as well. Thus, for example, the hot water pump 120 may be operated in conjunction with the opening of the hot water drain valve 118.

Various conditions within the modules 46 and elsewhere in the processing assembly 12 may be monitored by the controller 14 through appropriate sensors 36. For example, fluid level indicators 142 may be positioned within each of the modules, and appropriately connected to the controller 14 to enable the controller to read water levels within each of the modules. Similarly, each of the modules 46 may include temperature sensing devices 144 likewise connected to the controller 14 whereby the achievement of specified temperature conditions may be noted. The orientation of the drums within the modules 46 may be noted by appropriate sensors 36 connected directly to the drums, or to the mechanical couplings between the drums and the motors, or to the motor system 54. Similarly, flow gauges 146 may be positioned throughout the conduits to note the flow of supplies therethrough for the controller 14. The presence of a batch in the press 48 may also be noted by appropriate pressure sensors, for example, with the information fed to the controller 14.

It will be appreciated that additional and varied sensors 36 may be utilized to conduct information to the controller 14 concerning additional conditions throughout the processing assembly, including, for example, the presence of batches of goods at various locations in the feed mechanism 18 or the collection mechanism 20 (FIG. 1). Similarly, additional and varied operators 34 may be utilized to provide full control of the processing operation to the controller 14.

Figure 3:
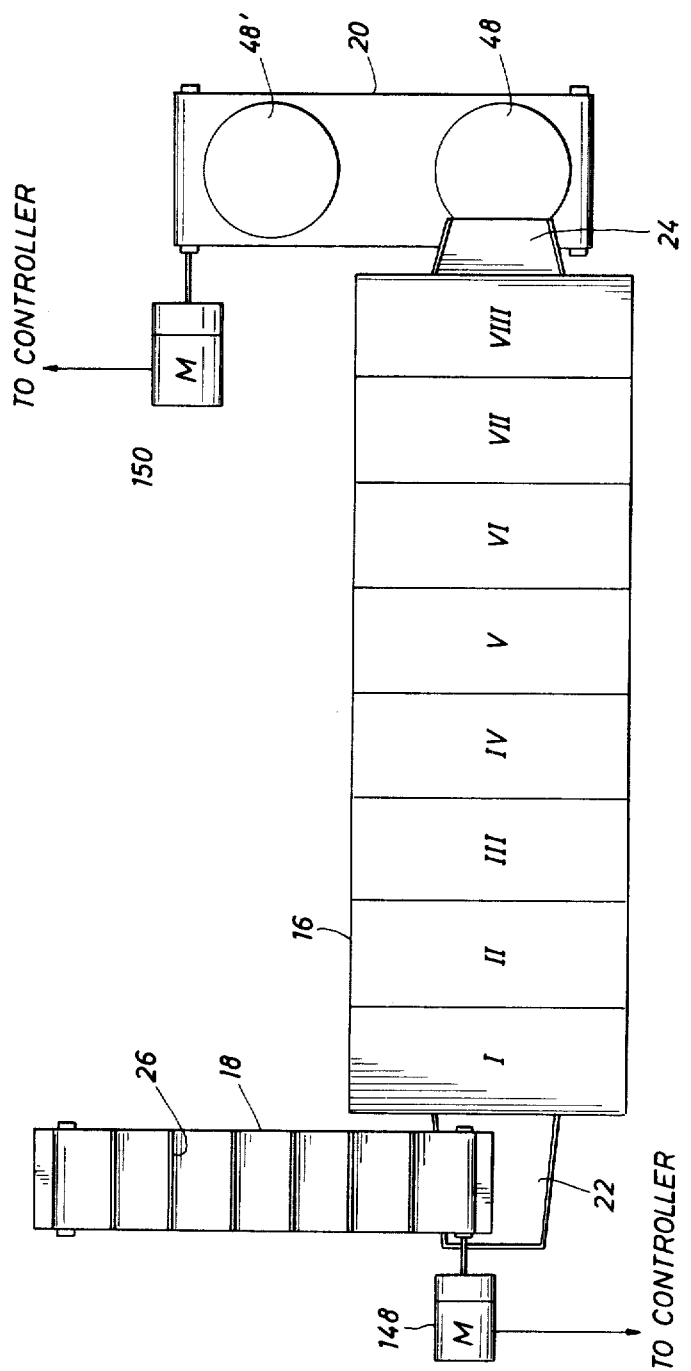
FIG. 3 is a schematic, plan view of the processing system of FIGS. 1 and 2, indicating feed and collection mechanisms.

In FIGS. 2 and 3 the use of operators 34 and sensors 36 to control various devices and to detect various conditions, respectively, thereby linking the processing assembly with the controller 14, is indicated by various brackets, arrows and notations to such effect.

FIG. 3 further illustrates the use of the feed mechanism 18 and the collection mechanism 20 in relation to the module array 16. Advancement of the feed mechanism 18 may be effected, for example, by means of a motor system 148, which is also controlled through one or more appropriate operators 34 by the controller 14. Similarly, the configuration of the feed mechanism 18 may be relayed to the controller 14 by appropriate sensors 36 connected to the motor 148, for example. Also, the presence of batches of goods in one or more of the compartments 26 of the feed mechanism 18 may be noted and the information transmitted to the control system 14 by appropriate pressure sensors or other detection devices.

The collection mechanism 20 is shown including a second press 48' in conjunction with the conveyer belt of the collection system. Thus, a batch of goods may be deposited in the first press 48, which is then activated to press fluid out of the goods. The conveyer belt of the collection mechanism 20 advances the batch of goods to the second press 48', which further presses fluid from the goods. A motor system 150, also controlled and monitored by the controller 14 through appropriate operators 34 and sensors 36, may be used to selectively advance the processed batches of goods from the first press 48 to the second press 48', and to then dump the pressed goods for further processing or handling.

It will be appreciated that the particular configurations of the feed mechanism 18 and the collection mechanism 20 are illustrated herein for purposes of illustration rather than limitation, and any appropriate type of feed and collection mechanisms may be utilized in conjunction with the present invention.

Figure 4A:
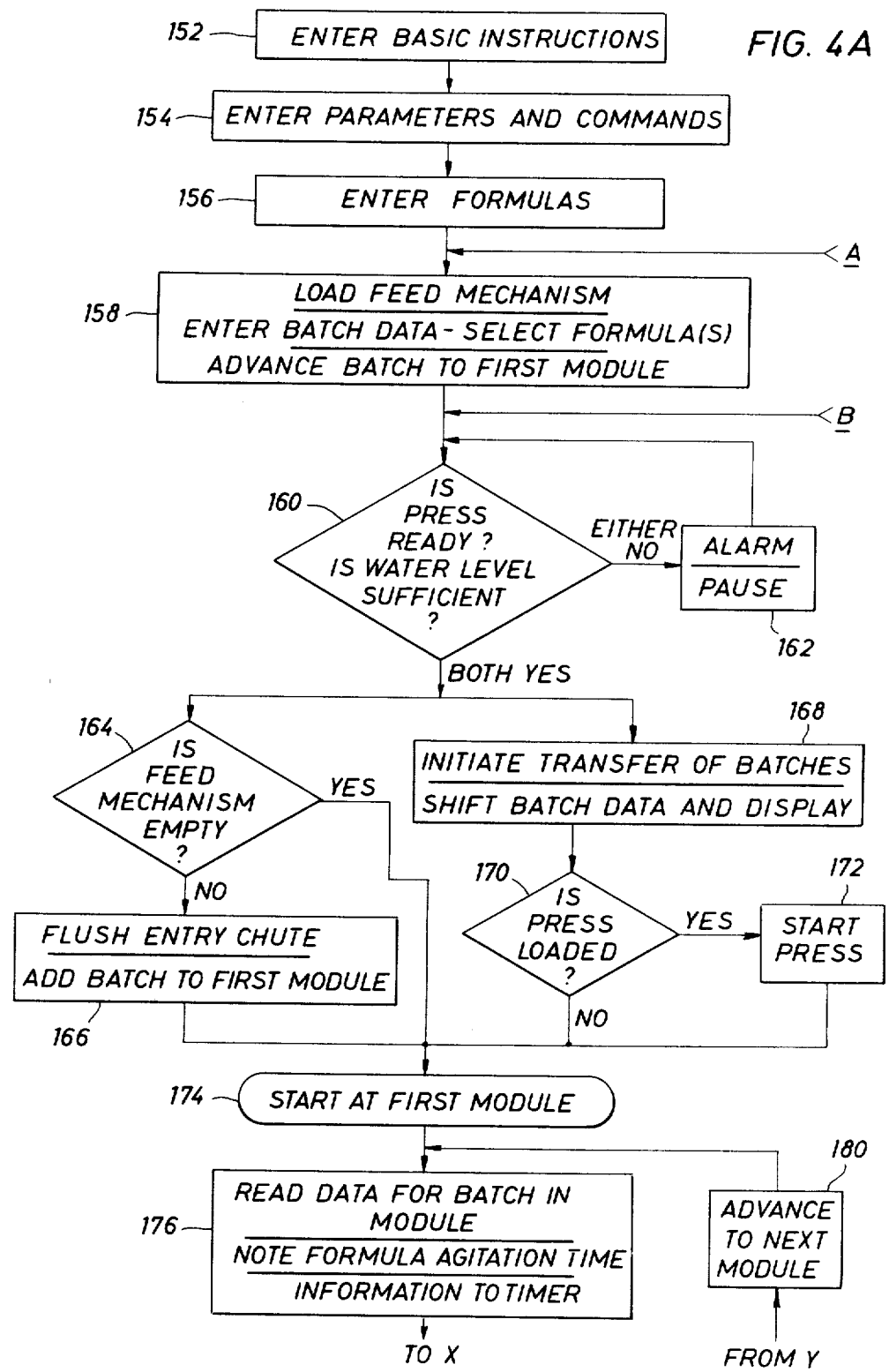
FIGS. 4A, 4B and 4C combined provide a flow diagram of method steps for controlling the operation of a processing system.
Figure 4B:
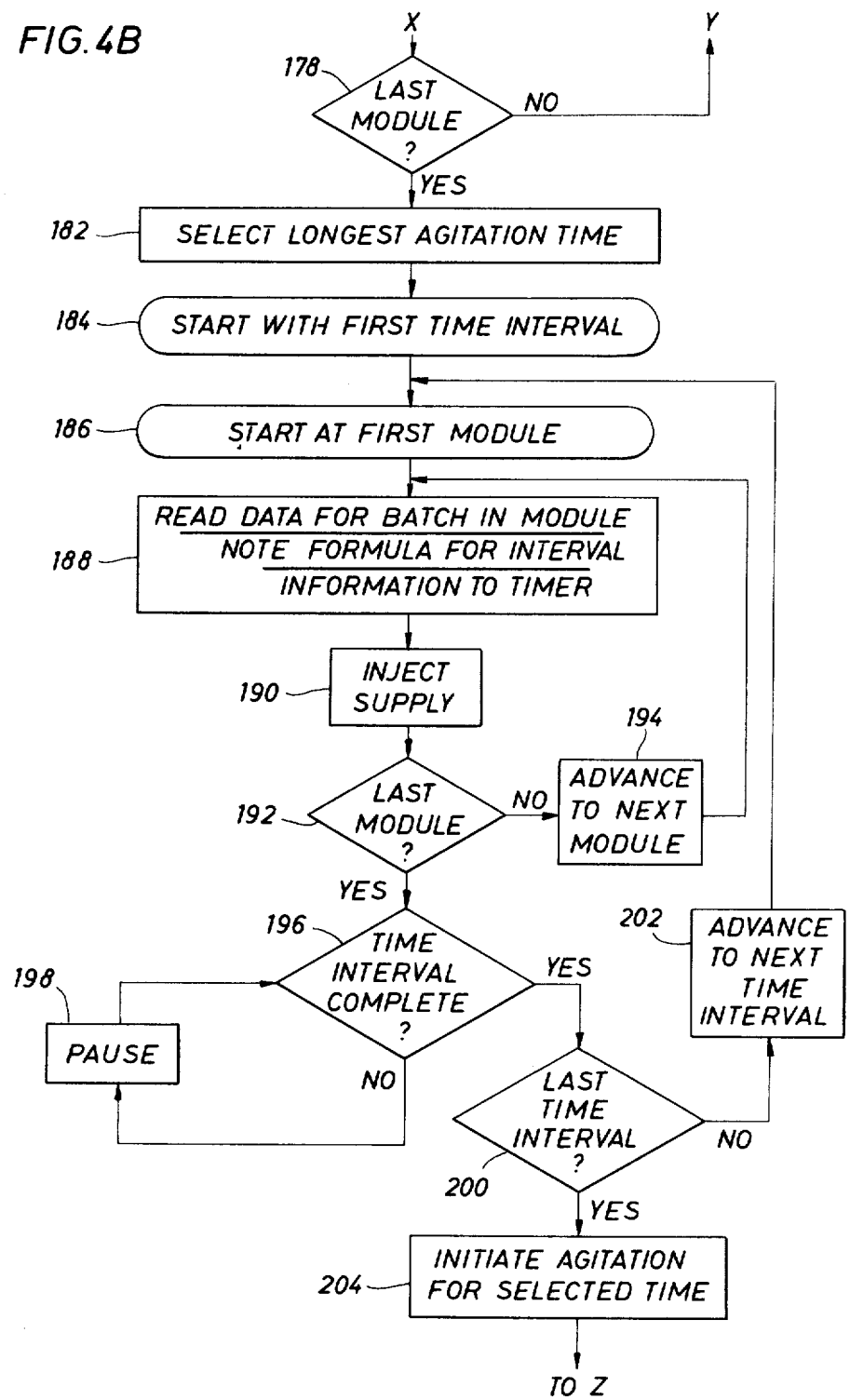
Figure 4C:
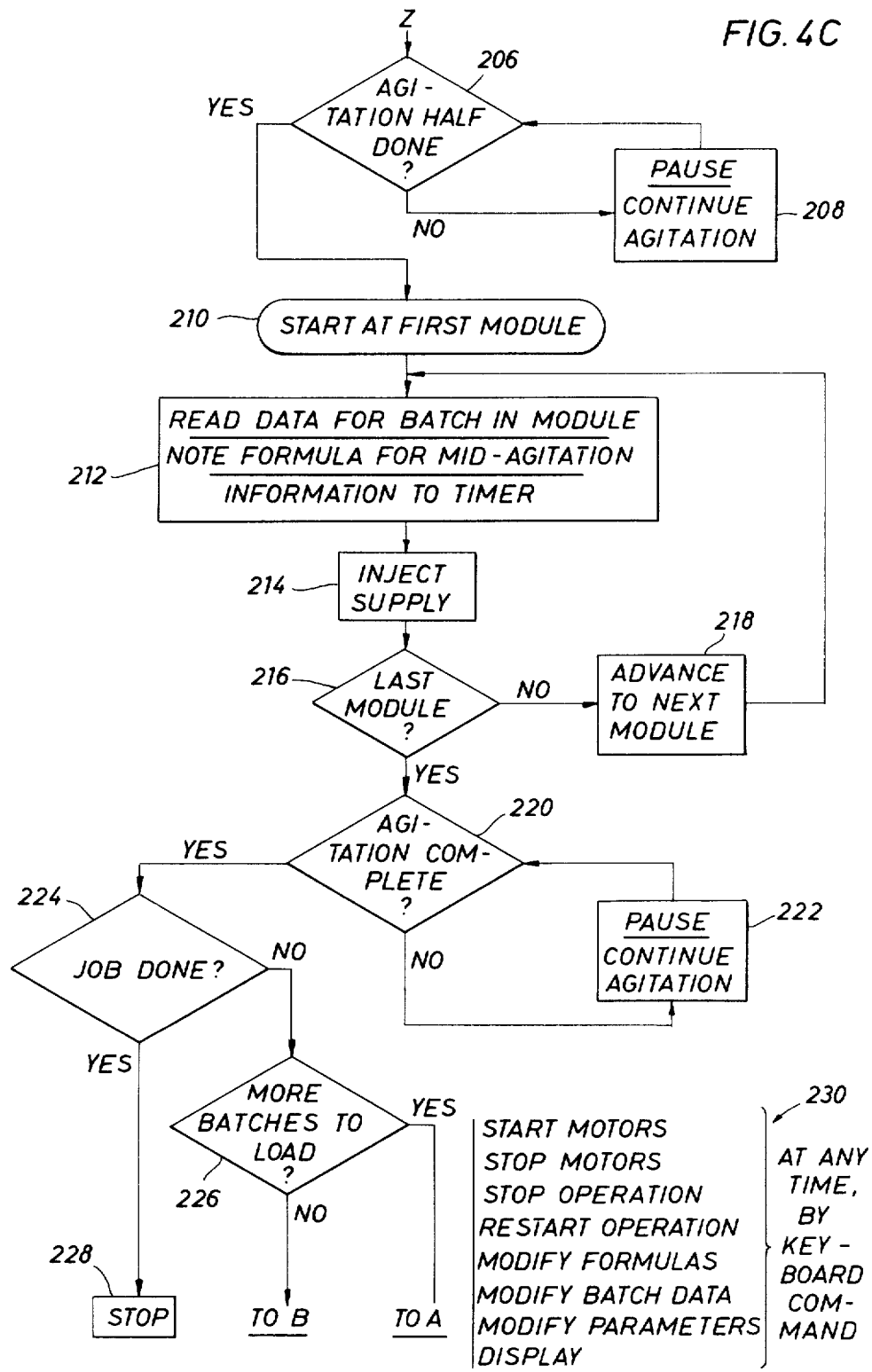

FIGS. 4A-4C combined show methods steps which may be effected in accordance with the present invention, and utilizing the apparatus illustrated in FIGS. 1-3, for example. The particular method steps thus illustrated may be employed with a variety of batch processing systems, and may be further varied, within the scope of the present invention. However, for purposes of illustration, the method steps detailed in FIGS. 4A-4C will be considered herein in conjunction with the aforementioned apparatus of FIGS. 1-3.

Initially, the basic instructions utilized to operate the controller 14 may be entered into the primary memory 30 at 152. As noted hereinbefore, the storage of the basic operational instructions for the control system 14 is at least semi-permanent in the primary memory. By contrast, the parameters peculiar to the particular processing assembly 12 with which the controller 14 is to function may be entered at 154, along with selected commands, and stored in the secondary memory 32. The parameters and commands may be altered to accommodate variations in the processing assembly 12, for example, as discussed more fully hereinafter. The entering of the parameters at 154 marks a plateau in the preparation of the controller 14, and particularly prepares the controller for use with a specific processing assembly 12.

In a similar fashion, the entering of formulas at 156 marks another level of preparation of the controller 14. The formulas are devised to meet the process needs of various types of goods to be processed by the assembly 12. In particular, where the processing assembly 12 is a washing tunnel, a separate formula may be devised to accommodate each general classification of goods to be laundered. For example, the requirements of heavy duty garments may be met by one formula. Sheets may be washed according to another formula. Dyed materials subject to running may be washed according to a third formula. In general, any number of formulas may be so devised to accommodate a like number of classifications of goods to be washed.

For a given formula, the kind and amount of supplies in general to be used in each module are specified along with the particular times, during which a batch of goods is in the particular module, the selected supplies are to be injected into the module. Also, the temperature of the water, the amount of water, and the agitation time for each module may be specified by the formula.

As a batch of goods is processed within the individual modules, and transferred from module to module along the wash tunnel, the various sensors 36 and operators 34 function to detect conditions within the tunnel and to control the operation of the tunnel modules and associated equipment, respectively. In this fashion, the processing assembly 12 is operated by the controller 14 according to the specified formulas, which may be entered at 156 as noted.

With the appropriate formulas entered in the secondary memory 32, the processing system 10 may be used to process individual batches of goods. The goods are separated into batches according to categories corresponding to various formulas entered at 156.

At 158, the batches of goods are loaded on the feed mechanism, mutually isolated by the compartments 26, for example. At the same time, the identification of each batch is entered in the secondary memory 32 by means of the keyboard terminal 40, with the identification data entered in the same order that the batches are arranged in the feed mechanism for advancement to the first module I. The entry of the identification data causes each batch of goods in the feed mechanism to be assigned a corresponding formula. The feed mechanism 18 may be initiated to advance a batch of goods to the first module I.

At this point of the process, particularly where the processing system 10 has been generally operated continuously, certain conditions of the processing assembly 12 may be noted. For example, since the press 48 may be about to receive a batch of goods, the status of the press is questioned as to whether the press is turned on, or occupied, etc. Also, for example, water levels in the various water reservoirs or supply may be noted, or water levels within the modules may be examined. If conditions are not acceptable for the transfer of batches as questioned at 160, the controller 14 may initiate an alarm 162 and pause until appropriate steps are taken to place the processing assembly 12 in condition for batch transfers.

When all conditions are acceptable for batch transfers, movement of the batches of goods may proceed. Generally, batches of goods may be transferred within the modular array 16 as well as from the feed mechanism 18 to the first module I. This circumstance is illustrated by two branches in the flow of the process indicated in FIG. 4A. At 164, the feed mechanism may be examined to determine whether additional batches are present therein for transfer to the modular array 16. If no batches are present to be added to the first module I, the feed mechanism 18 may then be disregarded. However, if a batch of goods is present in the feed mechanism 18, it may be dumped into the entry chute 22 to fall into the first module I as the entry chute is flushed at 166 by, for example, water from the cold reuse water reservoir 112 and the chemical supply B from the source 74. As noted hereinbefore, the control valves 78 and 124 may be operated by the controller 14 to achieve this flushing of the entry chute 22 to facilitate the transfer of the batch of goods into the first module I and to begin the cleaning process.

Along with the introduction of a batch of goods into the first module I, transfer of batches among the modules 46 may be initiated at 168 by operation of the motor system 54 to rotate the drums within the modules to dump whatever goods are in any one module into the subsequent module. During this process, any goods present in the last module VIII with be dumped through the chute 24 into the press 48.

In conjunction with the transfer of batches of goods, and the addition of a new batch of goods to the first module I, if any, the new positions of the various batches are noted by the controller 14. The controller 14 keeps track of the location of each batch of goods as it proceeds through the modular array 16, for example, so that the corresponding formula may follow each batch through the processing system 10 and control the processing of the batch at each stage of the system. This operation may be accomplished within the computer system of the controller 14, for example, by shifting the location of identifying instructions within the secondary memory 32 in conjunction with the effecting of the batch transfers by the controller.

If the transfer of batches at 168 deposits a batch of goods on the press 48, as querried at 170, the press may be initiated at 172. In the particular arrangement illustrated in FIG. 3, the initiation of the press 48 may be followed, under the direction of the controller 14, by transfer of the pressed goods to the second press 48'.

With the transfer of batches of goods complete, the control system 14 examines the formulas corresponding to each of the batches present in the module array 16. Starting at the first module at 174, the controller 14 notes at 176 the identification data for the batch in that module, and examines the corresponding formula for the agitation time required for that batch in that module. This agitation time information is passed to a timer included within the computer assembly of the controller 14. The controller 14 then determines at 178 whether subsequent modules are present, and at 180 moves to the next module in line if there is one. The step 176 is then repeated for the second module, the identification of the batch of goods in that module being first noted. The agitation time required for that batch in that module is passed to the timer as before, and the controller 14 again asks whether it has arrived at the last module in the array. The process is repeated until all modules have been examined, whether each contains a batch of goods or not. As a result of the steps 174-180, the timer is provided with all the various agitation times required by the formulas corresponding to the batches as they lie in the particular modules.

At 182, the longest agitation time thus discovered is selected. Then, the formulas corresponding to the batches in the modular array 16 are again examined.

As discussed hereinbefore, various process steps, such as the injection of particular supplies into the modules, may be carried out at different times during which the batches are residing in the respective modules. The formulas may be provided with a preselected number of specified time intervals. The time intervals may be defined by clock time, or may be determined by the occurrence of specified conditions within the modules, or by some other means appropriate to the processes to be effected, or by a combination of such methods.

Starting with the first time interval for each formula at 184, and again starting at the first module at 186, the controller identifies the batch residing in the module at 188, reads the corresponding formula for the first time interval, and passes to the timer of the computer system the information specified by that formula, for that module in that time interval. This information, for example, may dictate the kind of supplies to be injected into the module during that time interval, and the time during which the appropriate valve or valves are to remain open for such supply injection. At 190, the supplies so specified are injected into the module. At 192 the controller 14 determines whether all modules have been examined. If modules remain, the controller 14 directs its attention at 194 to the next module in line, and repeats steps 188 and 190 for the second module. The process involving steps 188-194 is repeatedly carried out until all modules have received their supplies as required by the formulas corresponding to the batches of goods in the respective modules for the first time interval in those modules.

With the last module receiving its required supplies, the controller 14 may, at 196, rely on information from its sensors 36, for example, or its own timer, to determine whether the first time interval is complete. If the first time interval has not been completed, the controller 14 will pause at 198. The controller 14 will not go to the next step of the procedure until the first time interval is completed.

With the completion of the first time interval, the controller 14 determines whether all time intervals have been completed at 200. If additional time intervals remain, the controller 14 advances to the next time interval at 202, and, again starting with the first module at 186, repeats the examination of each formula corresponding to the batch of goods in each module to determine the identification and amount of supplies to be injected into the corresponding module for the second time interval. Thus, the steps 188-194 are repeatedly carried out until all modules have received their supplies as required during the second interval for each formula.

Again, after the control system 14 determines that the second time interval is complete at 196, inquiry is made whether additional time intervals remain at 200. If additional time intervals are specified by the various formulas, the steps 186-202 are repeated a sufficient number of times to ensure that all supplies are added to the individual modules as required by the corresponding formulas, for each of the time intervals specified in the formulas and in the appropriate amounts and order as so specified.

When the control system 14 determines at 200 that all time intervals have been completed, the motor system 54 may be initated at 204 to agitate the batches in the modules 46 for the agitation time selected at 182.

Additional conditions may be determined to signal various stages in the carrying out of the formulas. For example, at 206 the controller 14 determines whether the agitation time is half done. If the agitation is still in the first half of its process, the controller 14 effectively pauses, and continues the agitation process at 208. Once it has been determined that the mid point of the agitation process has been reached, the controller 14 may again examine the formulas for additional process steps.

Starting at the first module at 210, the identification of the type of goods in the module is determined at 212, and the corresponding formula is noted for any requirements called for at the mid point of the agitation process in that module. These requirements are passed to the timer of the computer system. At 214 the supplies are injected as before, with the injections timed by the timer, and at 216 the controller 14 determines whether it has completed the supplying of the modules. If additional modules remain, the controller 14 advances to the next module at 218, and completes the steps 212 and 214 for the next module, adding the supplies called for by the corresponding formula at the mid agitation point of the process in that next module. Steps 212-218 are repeated as many times as needed to complete the injection of supplies into the various modules thus called for by the corresponding formulas at the particular stage in the individual processes.

When all supplies have been injected into the modules, the controller 14 inquires at 220 whether the agitation procedures have been completed. If the agitation time has not run out, the controller 14 effectively pauses at 222, and continues the agitation of the batches until complete.

Once it is determined at 220 that the agitation step has been completed, the controller 14 may inquire at 224 whether the job, or process, has been completed for all batches to be processed. If not all batches have been completely processed, the controller 14 may then inquire at 226 whether additional batches are to be loaded on the feed mechanism. Such a communication, for example, may be directed to the operator by means of the output terminal 42.

If no additional batches are to be loaded on the feed mechanism, the controller 14 returns to the process generally prior to the first transfer of batches within the modular array 16. For example, the process may be continued at 160, wherein the controller 14 inquires whether conditions within the processing system 10 are correct for proceeding with the transfer of batches of goods.

If additional batches of goods are to be loaded onto the feed mechanism, the controller 14 may return to allow repetition of step 158 in which the feed mechanism is loaded with additional batches. In any event, the procedure may be repeated from step 158 or from step 160 through step 224 again.

As the batch transfer steps 166 and 168 are repeated, the goods being processed are moved along the wash tunnel one step at a time. Thus, for example, a batch of goods starting in the first module I will be processed through steps 166 through 226, with the corresponding formula requirements specified for module I being completed. Upon repetition of step 168, the particular batch of goods will be transferred to module II, wherein the requirements of the same formula, as specified for module II, will be carried out as steps 174-226 are repeated. When step 168 is repeated again, the batch of goods proceeds to module III wherein the batch of goods is processed according to its corresponding formula, and as specified in that formula for module III. This process is continued until the batch is ejected from the last module VIII into the collection mechanism 20. The presses 48 and 48' may then be activated to appropriately remove fluid from the processed goods.

At any step in the method steps set out in FIGS. 4A-4C, where a module is empty of a batch of goods, there will be no formula steps directing the operation of the processing assembly 12 with respect to that module. Thus, where, for example, the controller 14 examines formulas at steps 176, 188 and 212, the controller will find no formula instructions to act on, and will pass over that module, not injecting any supplies. Further, if the conduct of step 168 in transferring batches among the modules results in all of the modules being empty, the controller will determine that no process steps characteristic of the various formulas provided in the secondary memory are to be effected and the system will advance essentially directly to step 224.

It will be appreciated that various procedures may be effected in conjunction with the process steps illustrated in FIGS. 4A-4C in addition to those already expressly noted. For example, the various drain valves may be operated according to the selected formulas so that water levels in the modules may be adjusted as desired. Further, the controller 14 may automatically drain each module as the transfer of batches at step 168 is being effected to ensure that a batch of goods entering a module will not come in contact with the fluid having been used to process goods being removed from that module.

At any time during the conduct of the process steps 154-228, for example, the operator may communicate with the secondary memory 32 and the data processor 28 by means of the input terminal 40 to instruct the controller to execute various commands. For example, as noted at 230, the operator may start or stop the various motors of the processing assembly 12. The entire operation being conducted by the processing assembly 12 under the direction of the controller 14 may also be stopped by the operator, and restarted at the operator's command.

Additionally, the various formulas that have been entered in the secondary memory 32 may, even during the operation of the processing assembly 12 in accordance with the formulas, be modified by the operator through the input terminal 40. Thus, for example, the operator may change a formula to increase the amount of supplies to be introduced during a specified time interval when a corresponding batch of goods will be in a particular module. This modification operation may be conducted even though such a batch of goods is being processed in the module array 16 at the time. The modification of the formula will take effect as it is entered. This is an important feature of the present invention, allowing the operator of the processing system 10 to "fine tune" the formulas for operating the processing assembly 12 on site without changing the permanent primary memory 30 and without need for stopping the operation of the system 10.

Similarly, the parameters entered in the secondary memory may be modified to correct the entry or to make note of changes in the configuration of the processing assembly 12. For example, a particular parameter may specify which modules may be connected by appropriate conduits 70 to the supply source 68. During the operation of the processing assembly 12, an additional conduit connection may be made to provide access from the supply source 68 to another module not previously specified among the parameters. Similarly, a module specified as able to receive supplies from the source 68 may be cut off from that source by the disconnection of the conduit or the freezing of a valve 72, for example. Whatever the change in parameters, the information stored in the secondary memory characteristic of the configuration of the processing assembly 12 may be altered during the operation of that assembly.

Similarly, the data identifying a given batch of goods may be changed, though that batch of goods is within the module array 16. Thus, the identification of a batch of goods may be corrected or altered during the operation of the processing assembly 12.

Further, at any time during the running of the processing system 10, the operator may instruct the controller 14 to display on the output terminal 42 any of the information entered in the secondary memory 32. This display capability extends to information entered in the secondary memory 32 by the operator, such as parameter, data and formula information, as well as information which the controller 14 obtains through the sensors 36, such as the various conditions within the processing assembly 12. For example, the operator may determine, by means of a display command, the location of the various batches within the module array 16. Also, the time interval for which the various formulas are being executed may be determined and displayed to the operator at the operator's command.

The various modifications and instructions available to the operator and indicated at 230 may be effected generally without interrupting the operation of the processing system 10. Thus, the operational instructions, for example, may be modified in real time.

The present invention thus provides method and apparatus for carrying out multi-stage processes, acting on various goods to be processed arranged in isolated batches. Further, the present invention provides a control system and method for conducting such operations, wherein the particular operational instructions and other information peculiar to the process may be altered in real time without interrupting the conduct of the process.

The foregoing disclosure and description of the invention is illustrative and explanatory thereof, and various changes in the method steps as well as in the details of the illustrated apparatus may be made within the scope of the appended claims without departing from the spirit of the invention.

I claim:

1. A method of operating a multi-stage batch processing system comprising the following steps:
    a. providing a programmable controller, having an accessible memory and being linked to the batch processing system for transmitting operational instructions thereto;
    b. providing to said memory at least one formula for operating the processing system by the controller;
    c. identifying a batch of goods to be processed according to one such formula;
    d. entering the batch of goods in the first stage of the processing system;
    e. noting the requirements of the selected formula for the first stage and, by the controller, carrying out those requirements;
    f. transferring the batch of goods to the next stage;
    g. noting the requirements of the selected formula for said next stage and, by the controller, carrying out those requirements; and
    h. repeating steps f. and g. herein until the batch of goods has been processed according to the selected formula in all stages of the processing system as required.

2. A method as defined in claim 1 further comprising the following additional steps:
    i. identifying a plurality of batches of goods to be processed in step c., selecting one formula for each such batch;
    j. entering in the first stage a batch of goods to be processed, if any, when a batch of goods is transferred from one stage to the next stage in step f.;
    k. carrying out steps e. and g. for all stages containing batches of goods, starting with the first stage followed by the remaining stages in sequence, using in each stage the formula selected for the batch of goods in that stage;
    l. in step f. transferring all batches of goods in the stages, each batch of goods advancing one stage, the batch of goods in the last stage being transferred out of the stages, and in step j. entering in the first stage a batch of goods to be processed, if any; and
    m. repeating steps c., d. and i. through l. until all batches of goods have been processed in all stages, according to the respective selected formula in the case of each batch of goods, as required.

3. A method as defined in claim 2 further comprising providing the capability of modifying the formulas while goods are being processed in the processing system.

4. A method as defined in claim 2 further comprising the steps of:
    a. so providing at least one of the formulas including a sequence of process steps to be effected, in at least one stage of the processing system, with the sequence distributed over specified time periods; and
    b. carrying out step k. separately for each time period when a batch of goods to be processed according to such formula is in such stage, by the controller, effecting the requirements in each stage starting with the first stage followed by the remaining stages in sequence for the first time period, then effecting the requirements, if any, in each stage in the same order for the next time period, and repeating until all requirements in all stages for all time periods have been effected.

5. A method as defined in claim 2 or, in the alternative, as defined in claim 1, further comprising the step of recording in the controller the location among the stages of a batch of goods in any stage.

6. A method as defined in claim 1 further comprising providing the capability of modifying at least one such formula while goods are being processed in the processing system.

7. A method as defined in claim 1 further comprising the steps of:
    a. so providing at least one of the formulas including a sequence of process steps to be effected, in at least one stage of the processing system, with the sequence distributed over specified time periods; and
    b. carrying out steps e. and g. separately for each time period when a batch of goods to be processed according to such formula is in such stage, by the controller, effecting the requirements in each stage for the first time period, then effecting the requirements, if any, in each stage for the next time period, and repeating until all requirements for all time periods have been effected.

8. A method as defined in claim 1 wherein said processing system is so operated to wash such goods.

9. A method as defined in claim 1 further comprising the additional steps of:
    a. providing the controller with at least one parameter characteristic of the batch processing system; and
    b. providing the capability of modifying such a parameter in the controller while goods are being processed in the processing system.

10. Apparatus for controlling the operation of a batch processing system, including a plurality of stages arranged for sequentially receiving batches of goods and wherein process steps may be effected on said goods, comprising:
   a. memory means for receiving and storing parameter information characteristic of such batch processing system, and formula information for operating said batch processing system;
   b. data processing means for acting in accordance with said parameter information and formula information for effecting operation of said batch processing system;
   c. operator means for manipulating said batch processing system in response to said data processing means;
   d. sensor means for detecting conditions of said batch processing system; and
   e. input means for entering said parameter information and said formula information in said memory means;
   f. wherein said parameter information and said formula information may be modified in said memory means while said batch processing systems is being operated.

11. Apparatus as defined in claim 10 wherein said formula information comprises one or more sets of operational instructions for operating said stages in processing such batches of goods.

12. Apparatus as defined in claim 10 wherein said memory means further comprises:
   a. first memory means for storing general instructions for operation of said controlling apparatus; and
   b. second memory means for storing said formula information and said parameter information such that said formula information and said parameter information may be varied by means of said input means.

13. Apparatus as defined in claim 12 wherein said input means comprises keyboard terminal means.

14. Apparatus as defined in claim 10 further comprising output terminal means for communicating conditions of said batch processing system and information from said memory means.

15. Apparatus as defined in claim 10 wherein said batch processing system comprises a washing system.

16. A system for processing goods, arranged in batches, comprising:
   a. a plurality of modules arranged for sequentially receiving such batches of goods and wherein process steps may be effected on said goods;
   b. sensor means for detecting conditions of said modules;
   c. operator means for manipulating the process steps within said modules; and
   d. control means, operable for effecting said process steps within said modules according to formulas which may be selectively provided to said control means, said formulas determining the operations of said operator means, and said formulas being selectively variable.

17. A system as defined in claim 16 wherein said system is a wash system.

18. A system as defined in claim 16 wherein:
   a. said modules may receive supplies; and
   b. said operator means manipulates the introduction of said supplies to said modules in accordance with such formulas corresponding to the batches of goods in the respective modules.

19. A system as defined in claim 16 wherein:
   a. said control means further receives parameter information characteristic of said system; and
   b. said parameter information is selectively variable in said control means.

* * * * *